US006137765A

United States Patent [19]

Saito et al.

[11] Patent Number: 6,137,765

[45] Date of Patent: Oct. 24, 2000

[54] OPTICAL DISC DRIVE APPARATUS WITH INCLINATION ANGLE CORRECTING MECHANISM

[75] Inventors: Takashi Saito, Ayase; Kazuo Okazaki, Tokyo; Akira Yoshida, Zama; Yasuhiro Mori, Yokohama; Takashi Tsurukubo, Yokosuka, all of Japan

[73] Assignee: Victor Company of Japan, Ltd., Yokohama, Japan

[21] Appl. No.: 09/189,981

[22] Filed: Nov. 12, 1998

[30] Foreign Application Priority Data

Nov. 28, 1997 [JP] Japan .................................... 9-344518

[51] Int. Cl.[7] ............................ G11B 17/30; G11B 3/38; G11B 21/24

[52] U.S. Cl. ............................................ 369/219; 369/249

[58] Field of Search ................................ 369/219, 44.21, 369/249, 215, 244, 255

[56] References Cited

U.S. PATENT DOCUMENTS

| | | | |
|---|---|---|---|
| 4,249,745 | 2/1981 | Dold | 369/219 |
| 4,823,336 | 4/1989 | Inada et al. | 369/215 |
| 5,130,972 | 7/1992 | Mizuno et al. | 369/215 |
| 5,768,248 | 6/1998 | Lee | 369/219 |
| 5,963,535 | 10/1999 | Yamakawa et al. | 369/219 |

FOREIGN PATENT DOCUMENTS

| | | |
|---|---|---|
| 56-269268 | 12/1981 | Japan . |
| 2-94115 | 4/1990 | Japan . |
| 2-189721 | 7/1990 | Japan . |
| 2-89617 | 7/1990 | Japan . |
| 2-214024 | 8/1990 | Japan . |
| 4-222930 | 8/1992 | Japan . |
| 9-306115 | 11/1997 | Japan . |
| 9-306116 | 11/1997 | Japan . |
| 10-31827 | 2/1998 | Japan . |
| 10-105981 | 4/1998 | Japan . |
| 10-105982 | 4/1998 | Japan . |
| 10-134358 | 5/1998 | Japan . |

*Primary Examiner*—George J. Letscher
*Assistant Examiner*—Julie Anne Watko
*Attorney, Agent, or Firm*—Louis Woo

[57] ABSTRACT

An optical disc drive apparatus includes a reference base. A turntable provided on the reference base operates for receiving an optical disc thereon. An optical pickup head supported by a guide shaft is movable along the guide shaft in a radial direction of the optical disc on the turntable. A movable base supports the guide shaft, and is movably connected to the reference base. The movable base is inclined relative to the reference base at an adjustable inclination angle. A mechanism operates for moving the movable base relative to the reference base and adjusting the inclination angle to correct a tilt of an optical axis of the optical pickup head with respect to an information recording surface of the optical disc on the turntable. A plurality of guide members fixed to the reference base have respective guide surfaces. Guide rollers connected to the guide shaft are in contact with the guide surfaces of the guide members respectively.

11 Claims, 12 Drawing Sheets

2
3
5
7
8
9
10
11
12
12
13b
14a
14b
15
16
18
18
18
19
20
21
22
23
23
24
24
25
26
27
27
28
28a
46

3
2
4
5
6
7
9
11
11
13a
13b
14a
14b
15
16
17
17
18
18
19
21
22
23
23
24
24
25
26
28
28a
30
31
32

OPTICAL DISC DRIVE APPARATUS WITH INCLINATION ANGLE CORRECTING MECHANISM

BACKGROUND OF THE INVENTION

1. Field of the Invention

This invention relates to an optical disc drive apparatus having a tilt correcting mechanism.

2. Description of the Related Art

An optical disc drive apparatus records and reproduces information on and from an optical disc. The optical disc drive apparatus includes an optical pickup head applying a laser light beam to the information recording surface of the optical disc. It is desirable that the direction of the applied laser light beam is perpendicular to the information recording surface of the optical disc. It should be noted that the laser light beam is also referred to as the laser beam.

In general, optical discs tend to be deformed from their original shapes by various causes. Such deformation of an optical disc adversely affects the perpendicularity between the direction of an applied laser beam and the information recording surface of the optical disc. It is known to provide an optical disc drive apparatus with a tilt correcting mechanism to maintain the perpendicularity between the direction of an applied laser beam and the information recording surface of an optical disc even when the optical disc is deformed from its original shape.

Japanese published unexamined patent application 2-94115 discloses a tilt correcting mechanism in an optical disc drive apparatus. As will be explained later, the tilt correcting mechanism of Japanese application 2-94115 has problems which cause reductions in accuracy of tilt correction.

SUMMARY OF THE INVENTION

It is an object of this invention to provide an improved optical disc drive apparatus.

A first aspect of this invention provides an optical disc drive apparatus comprising a reference base; a turntable provided on the reference base for receiving an optical disc thereon; a guide shaft; an optical pickup head supported by the guide shaft and being movable along the guide shaft in a radial direction of the optical disc on the turntable; a movable base supporting the guide shaft and being movably connected to the reference base, the movable base being inclined relative to the reference base at an adjustable inclination angle; means for moving the movable base relative to the reference base and adjusting the inclination angle to correct a tilt of an optical axis of the optical pickup head with respect to an information recording surface of the optical disc on the turntable; a plurality of guide members fixed to the reference base and having respective guide surfaces; and guide rollers connected to the guide shaft and being in contact with the guide surfaces of the guide members respectively.

A second aspect of this invention is based on the first aspect thereof, and provides an optical disc drive apparatus further comprising leaf springs for pressing the guide rollers against the guide surfaces of the guide members.

A third aspect of this invention is based on the second aspect thereof, and provides an optical disc drive apparatus wherein the leaf springs have bent portions for releasably holding the guide shaft at its neutral position which corresponds to absence of a tilt from the optical axis of the optical pickup head.

A fourth aspect of this invention is based on the first aspect thereof, and provides an optical disc drive apparatus wherein the guide shaft includes first and second sub shafts parallel to each other, and the guide rollers are connected to only one of the first and second sub shafts.

DESCRIPTION OF THE PREFERRED EMBODIMENTS

A prior-art optical disc drive apparatus will be explained below for a better understanding of this invention.

Figure 1:
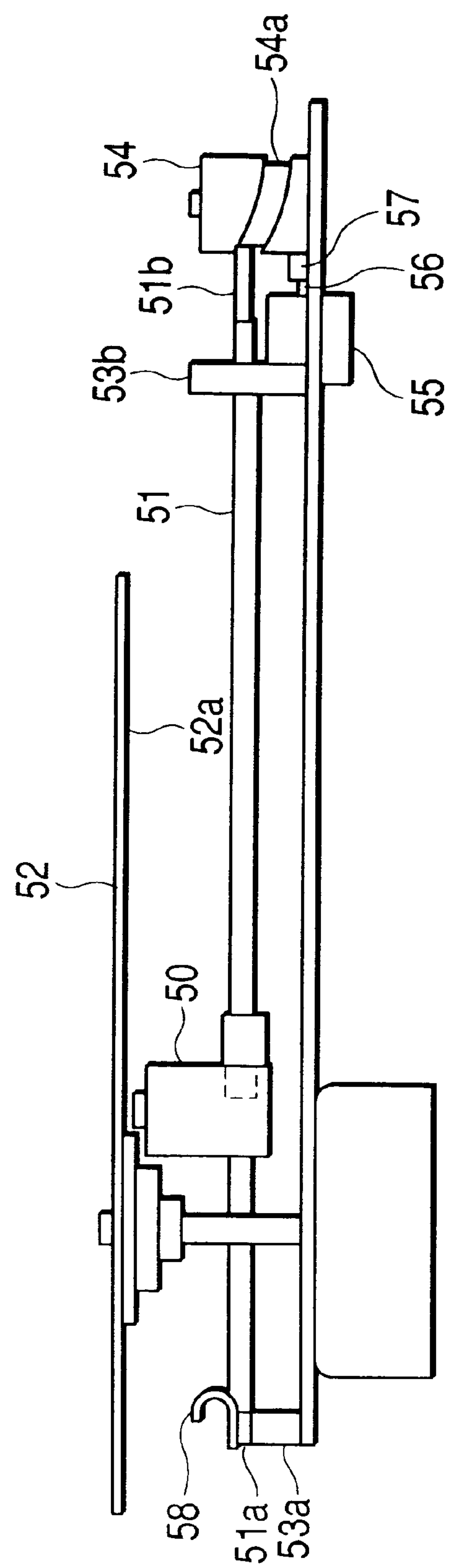
FIG. 1 is a side view of a prior-art optical disc drive apparatus.

FIG. 1 shows an optical disc drive apparatus disclosed in Japanese application 2-94115. The prior-art apparatus of FIG. 1 includes an optical pickup head 50 slidably mounted on a guide shaft 51. A first end 51*a* of the guide shaft 51, which is close to the center of an optical disc 52, is connected to a support member 53*a* by a leaf spring 58. The guide shaft 51 can rotate about the first end 51*a* thereof. The optical pickup head 50 applies a laser light beam to the lower surface (the information recording surface) 52*a* of the optical disc 52. It should be noted that the laser light beam is also referred to as the laser beam. The laser beam travels from the optical pickup head 50 in a direction along the optical axis of the optical pickup head 50. The angle between the optical axis of the optical pickup head 50 and the lower surface 52*a* of the optical disc 52 varies in accordance with the rotation of the guide shaft 51 about the first end 51*a* thereof.

In the prior-art apparatus of FIG. 1, a second end 51*b* of the guide shaft 51, which is remote from the center of the optical disc 52, fits into a groove (not shown) in a support pole 53*b*. Thus, the second end 51*b* of the guide shaft 51 engages the support pole 53*b*. The second end 51*b* of the guide shaft 51 can slide approximately vertically along the groove in the support pole 53*b*. The slide of the second end 51*b* of the guide shaft 51 relative to the support pole 53*b* allows the rotation of the guide shaft 51 about the first end 51*a* thereof. In addition, the second end 51*b* of the guide shaft 51 fits into a helical cam groove 54*a* in a cylindrical cam gear 54. Thus, the second end 51*b* of the guide shaft 51 engages the cylindrical cam gear 54. As the cylindrical cam gear 54 rotates, the second end 51*b* of the guide shaft 51 relatively slides along the cam groove 54*a*. The slide of the second end 51*b* of the guide shaft 51 relative to the cylindrical cam gear 54 causes the rotation of the guide shaft 51 about the first end 51*a* thereof.

In the prior-art apparatus of FIG. 1, the cylindrical cam gear 54 is connected to the output shaft of a motor 55 via a worm 56 and a gear 57. The cylindrical cam gear 54 rotates in accordance with rotation of the output shaft of the motor 55.

In the prior-art apparatus of FIG. 1, the optical pickup head 50 detects the angle between the optical axis thereof and the information recording surface 52*a* of the optical disc 52. When the detected angle differs from 90 degrees, that is, when the optical pickup head 50 tilts relative to the information recording surface 52*a*, the optical pickup head 50 drives the motor 55 to rotate its output shaft by an amount provided by a given program in response to the degree of the tilt. The cylindrical cam gear 54 rotates in accordance with the rotation of the output shaft of the motor 55. As the cylindrical cam gear 54 rotates, the guide shaft 51 rotates about its first end 51*a*. The rotation of the guide shaft 51 about its first end 51*a* returns the angle between the optical axis of the optical pickup head 50 and the information recording surface 52*a* of the optical disc 52 to 90 degrees. Accordingly, the tilt of the optical pickup head 50 relative to the information recording surface 52*a* of the optical disc 52 is corrected. As a result, the angle between the optical axis of the optical pickup head 50 and the information recording surface 52*a* of the optical disc 52 is substantially held at 90 degrees.

In the prior-art apparatus of FIG. 1, to enable smooth slide of the second end 51*b* of the guide shaft 51 along the groove in the support pole 53*b*, there is provided a given clearance or a given gap between the surfaces of the second end 51*b* of the guide shaft 51 and the surfaces of the support pole 53*b* which define the groove in the support pole 53. As the clearance (the gap) increases, suitable positioning of the optical pickup head 50 in a tangential direction of a track on the optical disc 52 tends to be more difficult. Thus, the clearance (the gap) is generally set to a small value. When the clearance (the gap) is small, a significant resistance tends to be provided to the slide of the guide shaft 51 relative to the support pole 53*b*. Such a resistance adversely affects the correction of a tilt of the optical pickup head 50 relative to the information recording surface 52*a* of the optical disc 52. Specifically, the resistance reduces the accuracy of the tilt correction.

First Embodiment

Figure 2:
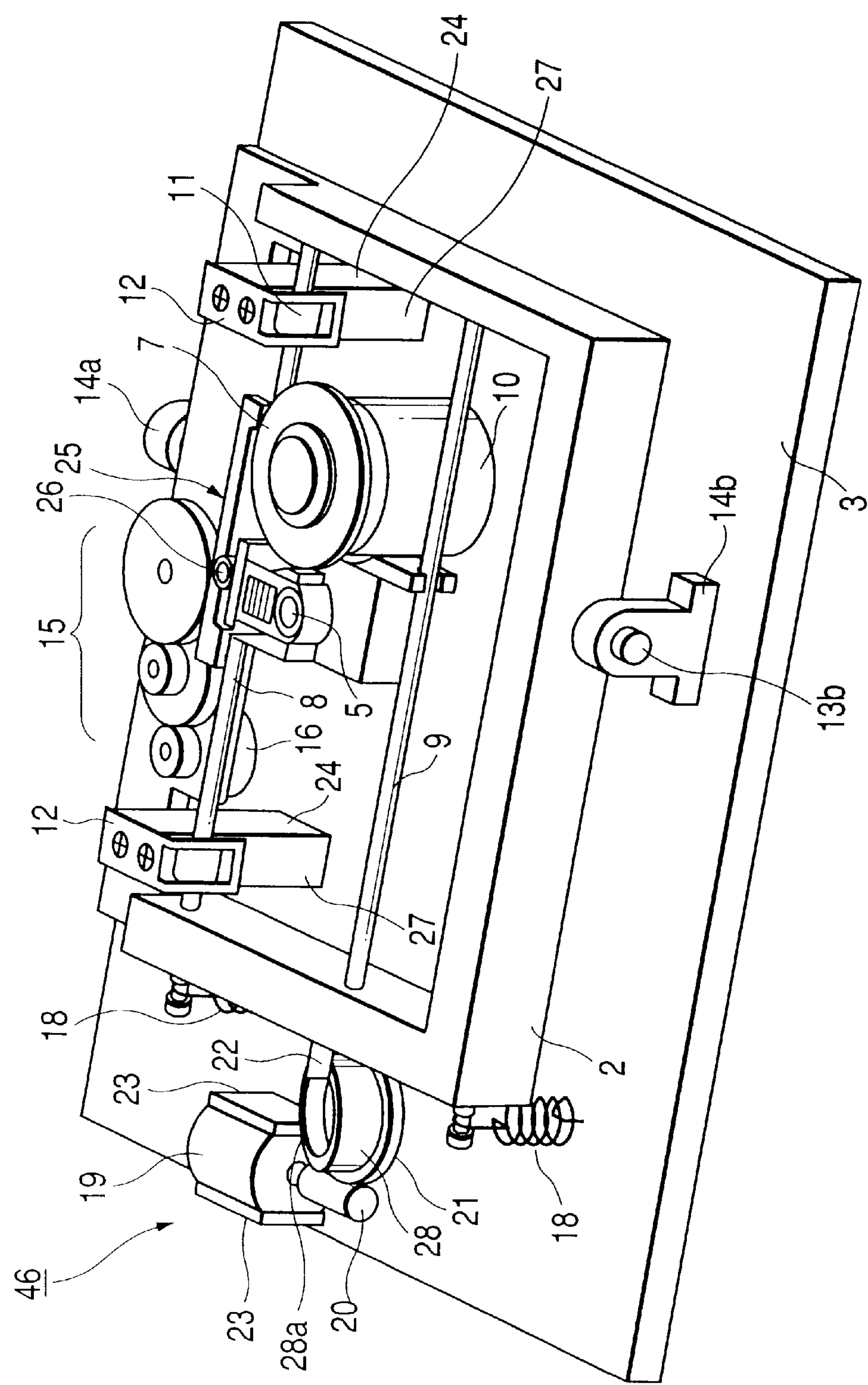
FIG. 2 is a perspective view of an optical disc drive apparatus according to a first embodiment of this invention.
Figure 3:
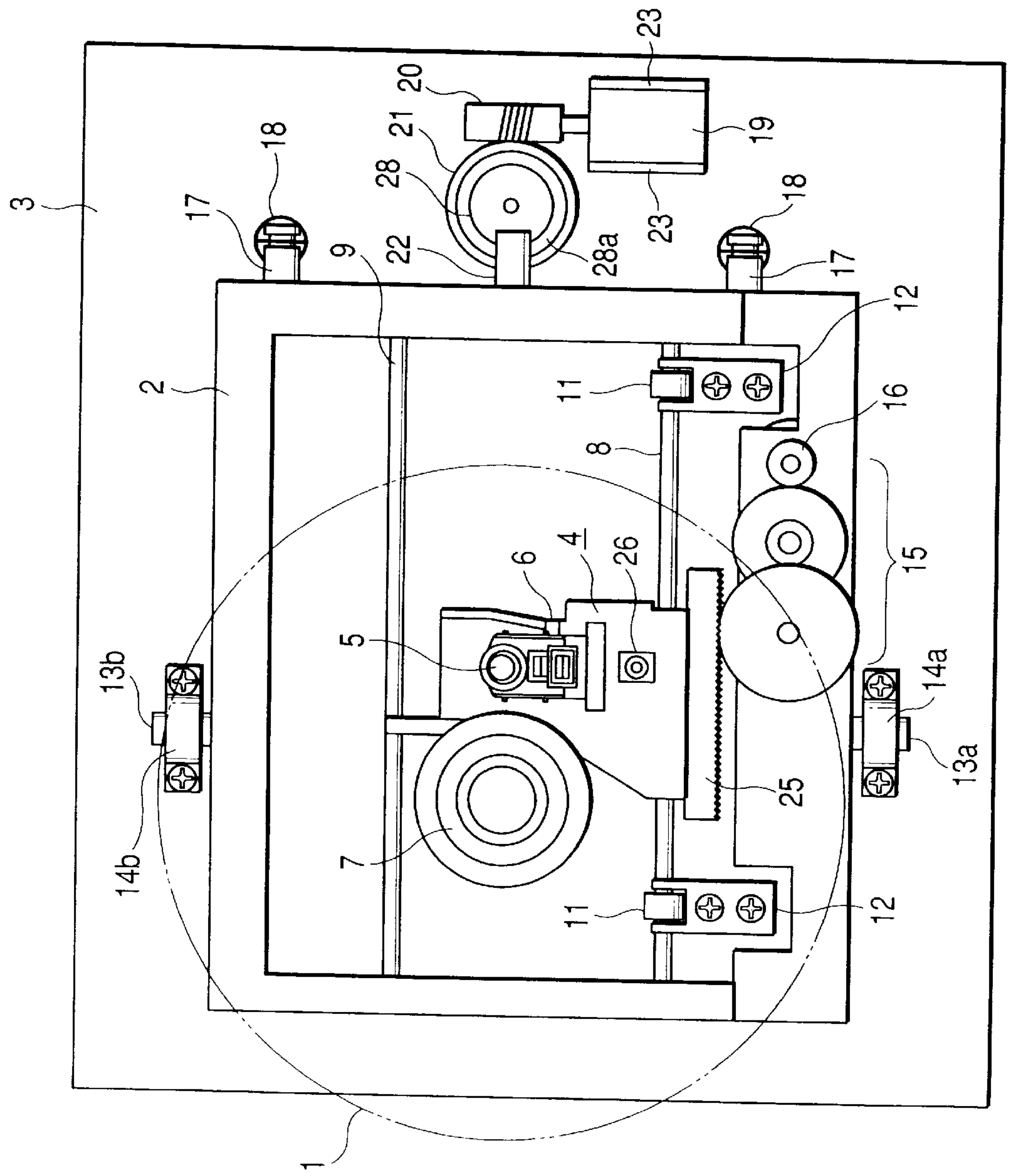
FIG. 3 is a plan view of the optical disc drive apparatus in FIG. 2.
Figure 4:
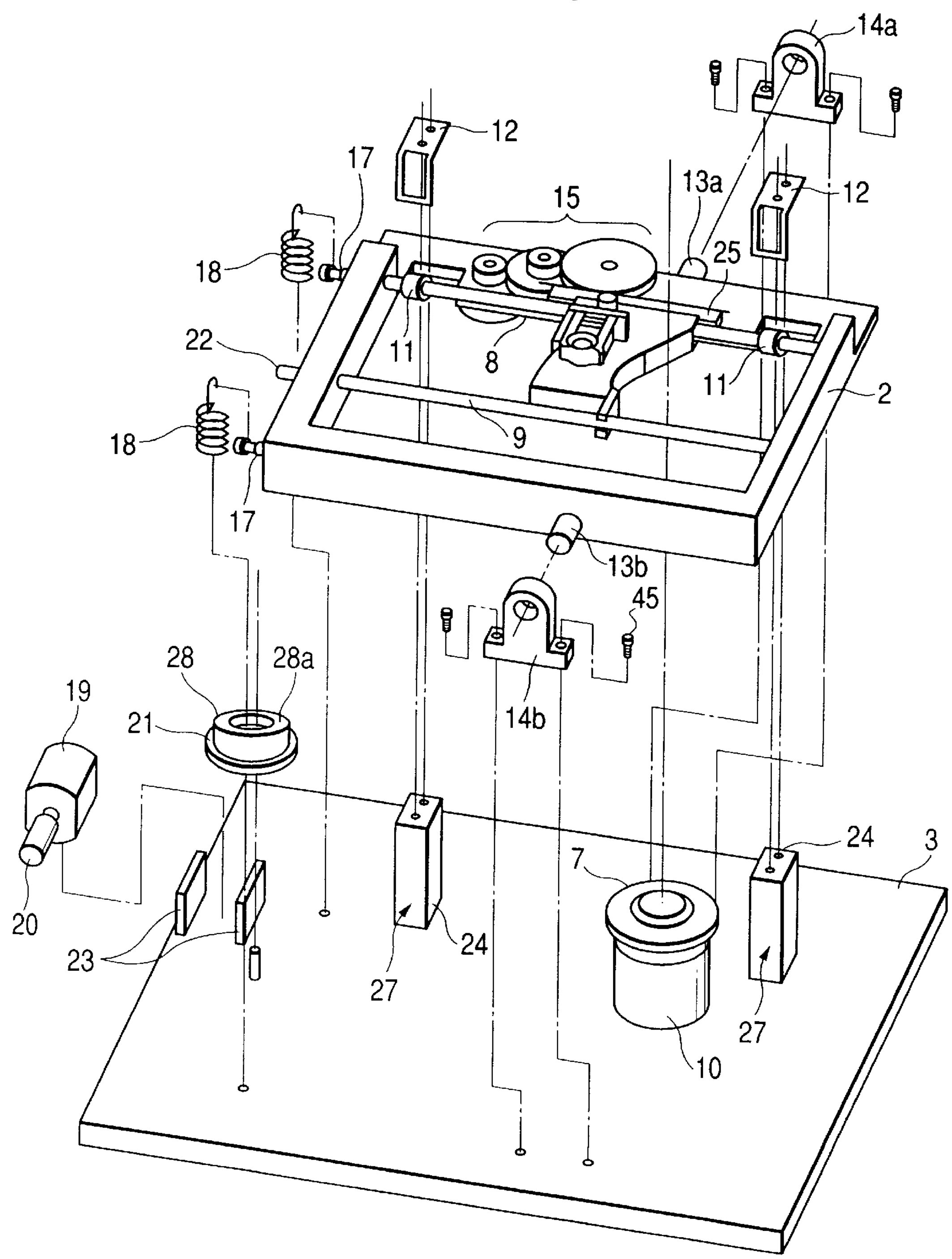
FIG. 4 is an exploded view of the optical disc drive apparatus in FIG. 2.

With reference to FIGS. 2, 3, and 4, an optical disc drive apparatus of a first embodiment of this invention includes a turntable 7 rotated by a spindle motor 10. An optical disc 1 is placed on the turntable 7. The turntable 7 and the optical disc 1 rotate together. The body of the spindle motor 10 is mounted on a reference base (a fixed base) 3. The reference base 3 is also referred to as the apparatus base 3.

A movable base 2 is supported on the apparatus base 3. The movable base 2 has a shape of a rectangular frame formed with an opening or a recess. Central portions of opposite sides of the movable base 2 have outwardly-projecting tilt shafts 13*a* and 13*b* of a given short length. Hold members 14*a* and 14*b* are fixed to the apparatus base 3 by screws 45. The tilt shafts 13*a* and 13*b* are rotatably supported by the hold members 14*a* and 14*b*, respectively. Accordingly, the movable base 2 can rotate about the tilt shafts 13*a* and 13*b* relative to the apparatus base 3.

A main guide shaft 8 and an auxiliary guide shaft 9 are fixed to the movable base 2. The main guide shaft 8 and the auxiliary guide shaft 9 are parallel to each other. The main guide shaft 8 and the auxiliary guide shaft 9 extend in the opening (the recess) of the movable base 2 along the longitudinal direction of the movable base 2. An optical pickup head 4 is slidably mounted on the main guide shaft 8 and the auxiliary guide shaft 9. The optical pickup head 4 can move along the main guide shaft 8 and the auxiliary guide shaft 9.

The optical pickup head 4 includes a laser light source (not shown), an objective lens 5, and a tilt sensor 26. The laser light source generates a laser light beam which passes through the objective lens 5. It should be noted that the laser light beam is also referred to as the laser beam. The objective lens 5 is driven by a lens driver 6 to implement focusing control and tracking control. The lens driver 6 has a tracking coil and a focusing coil which form portions of actuators for the objective lens 5. The optical pickup head 4 has an optical axis which agrees with the optical axis of the objective lens 5. The laser beam travels from the optical pickup head 4 in a direction along the optical axis of the optical pickup head 4. The angle between the optical axis of the optical pickup head 4 and the information recording surface of the optical disc 1 (that is, the tilt of the optical axis of the optical pickup head 4 with respect to the information recording surface of the optical disc 1) varies in accordance with the rotation of the movable base 2 about the tilt shafts 13*a* and 13*b*.

The tilt sensor 26 detects the angle between the optical axis of the optical pickup head 4 and the information recording surface of the optical disc 1 (that is, the tilt of the optical axis of the optical pickup head 4 with respect to the information recording surface of the optical disc 1). As will be explained later, the angle detected by the tilt sensor 26 is used in tilt control.

The optical pickup head 4 is connected to the main guide shaft 8 via a cylindrical sliding bearing (not shown). Alternatively, a frame of the optical pickup head 4 may have a cylindrical hole through which the main guide shaft 8 extends. In general, a driver for moving the optical pickup head 4 is provided on the side of the main guide shaft 8. The driver for the optical pickup head 4 includes a gear train, a rack, and a feed motor. The frame of the optical pickup head 4 has a groove or an elongated hole through which the auxiliary guide shaft 9 extends. The connection of the optical pickup head 4 with the main guide shaft 8 and the auxiliary guide shaft 9 is designed to allow movement of the optical pickup head 4 only in a direction along the main guide shaft 8 and the auxiliary guide shaft 9. Specifically, the connection of the optical pickup head 4 with the auxiliary guide shaft 9 is designed to inhibit movement of the optical pickup head 4 along the optical axis thereof.

One side of the frame of the optical pickup head 4 is formed with a linear rack 25 whose length is designed to cover the seeking area of the optical pickup head 4. The body of a feed motor 16 is fixed to the lower surface of the movable base 2. The output shaft of the feed motor 16 rotatably extends through the walls of the movable base 2. The output shaft of the feed motor 16 is connected to the rack 25 via a gear train 15. As the output shaft of the feed motor 16 rotates clockwise and counterclockwise, the rack 25 and the optical pickup head 4 move back and forth along the main guide shaft 8 and the auxiliary guide shaft 9.

A central portion of one side of the movable base 2 has a horizontally-projecting drive pin 22. The drive pin 22 contacts a ring-like upper surface 28*a* of a cylindrical cam 28 rotatably supported on the apparatus base 3. The drive pin 22 can slide relative to the upper surface 28*a* of the cylindrical cam 28. The upper surface 28*a* of the cylindrical cam 28 forms a portion of a plane which is inclined at a given angle to the horizontal level defined by the apparatus base 3. Therefore, the drive pin 22 moves up and down as the cylindrical cam 28 rotates. The outer circumferential surfaces of the cylindrical cam 28 have a gear 21 in mesh with a worm 20 mounted on the output shaft of a tilt motor 19. The cylindrical cam 28 rotates as the output shaft of the tilt motor 19 rotates. The tilt motor 19 has a body firmly sandwiched between two hold members 23. The two hold members 23 are fixed to the apparatus base 3. Thus, the body of the tilt motor 19 is attached to the apparatus base 3 by the hold members 23.

The side of the movable base 2, on which the drive pin 22 is provided, has two outwardly-projecting pins 17 being integral with the rest of the movable base 2. First ends of springs 18 are connected to the apparatus base 3. Second ends of the springs 18 are connected to the pins 17 respectively. Thus, the springs 18 extend between the apparatus base 3 and the pins 17. The springs 18 urge the related side of the movable base 2 toward the apparatus base 3, thereby bringing the drive pin 22 into reliable contact with the upper surface 28*a* of the cylindrical cam 28.

When the output shaft of the tilt motor 19 rotates, the cylindrical cam 28 rotates. The drive pin 22 moves up and down as the cylindrical cam 28 rotates. The movable base 2 rotates clockwise and counterclockwise about the tilt shafts 13*a* and 13*b* in accordance with the up and down motion of the drive pin 22. The angle between the optical axis of the optical pickup head 4 and the information recording surface of the optical disc 1 (that is, the tilt of the optical axis of the optical pickup head 4 with respect to the information recording surface of the optical disc 1) varies in accordance with the rotation of the movable base 2 about the tilt shafts 13*a* and 13*b*.

The tilt motor 19, the worm 20, the gear 21, and the cylindrical cam 28 compose a mechanism 46 for correcting the tilt of the optical axis of the optical pickup head 4 relative to the information recording surface of the optical disc 1. This tilt correction responds to the output signal of the tilt sensor 26. Specifically, the tilt motor 19 is controlled in response to the output signal of the tilt sensor 26.

The optical disc drive apparatus of FIGS. 2, 3, and 4 includes a featuring mechanism for accurately positioning the optical pickup head 4 in a tangential direction of a track on the optical disc 1. The featuring mechanism will be explained below.

Figure 5:
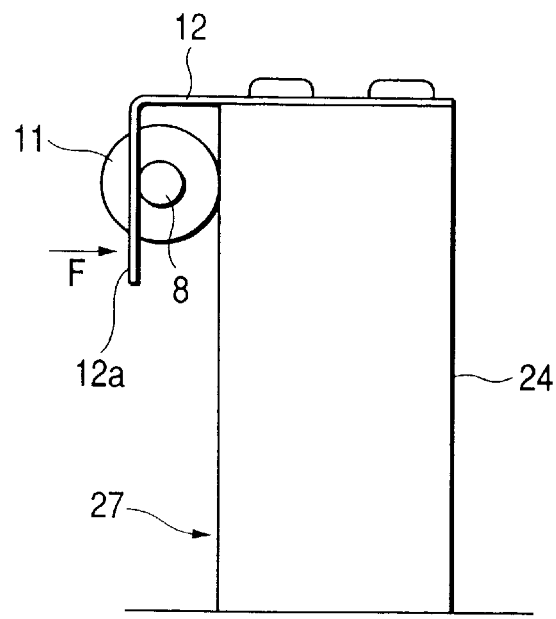
FIG. 5 is a side view of a guide member, a guide roller, and a main guide shaft in the optical disc drive apparatus of FIG. 2.
Figure 6:
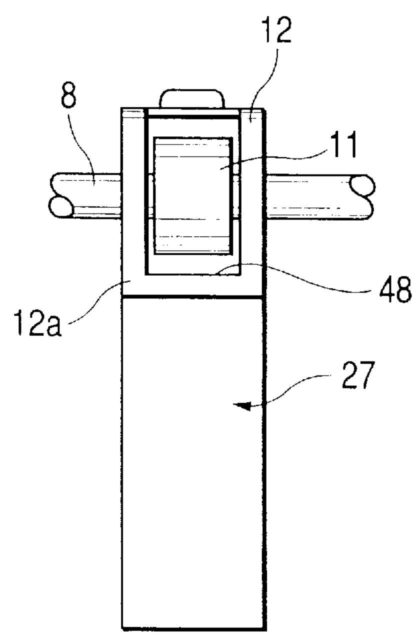
FIG. 6 is a front view of the guide member, the guide roller, and the main guide shaft in FIG. 5.

With reference to FIGS. 2–6, two guide rollers 11 are rotatably mounted on end portions of the main guide shaft 8, respectively. The guide rollers 11 are inhibited from moving along the axis of the main guide shaft 8 (that is, along the length-wise direction of the main guide shaft 8). As best shown in FIGS. 5 and 6, the guide rollers 11 contact guide surfaces 27 which are formed by side surfaces of guide members 24 having a rectangular cross-section. The guide members 24 are fixed to the apparatus base 3. The guide rollers 11 can slide relative to the guide surfaces 27. The guide surfaces 27 are perpendicular to the upper surfaces of the apparatus base 3. The guide surfaces 27 are parallel to the axis of the main guide shaft 8. The guide surfaces 27 are spaced from the axis of the main guide shaft 8 in directions substantially parallel to a tangential direction of the track on the optical disc 1. The guide members 24 are spaced from each other along the axis of the main guide shaft 8 which is substantially parallel to a tangential direction of the track on the optical disc 1. Similarly, the guide rollers 11 are spaced from each other along the axis of the main guide shaft 8.

Each of approximately L-shaped leaf springs 12 has a horizontal portion, and a vertical portion 12*a* extending downward from an edge of the horizontal portion. The horizontal portions of the leaf springs 12 are fixed to the upper ends of the guide members 24 by screws, respectively. The vertical portions 12*a* of the leaf springs 12 have openings 48 greater in size than the guide rollers 11. The guide rollers 11 extend through the openings 48 in the vertical portions 12*a* of the leaf springs 12, respectively. The vertical portions 12*a* of the leaf springs 12 contact the main guide shaft 8. The leaf springs 12 urge the main guide shaft 8 toward the guide surfaces 27 by forces "F" (see FIG. 5) so that the guide rollers 11 will be pressed against the guide surfaces 27.

During the rotation of the movable base 2 about the tilt shafts 13*a* and 13*b*, the guide rollers 11 rotate relative to the guide surfaces 27 while remaining in contact therewith. The continuous contact between the guide rollers 11 and the guide surfaces 27 inhibits the main guide shaft 8 and the optical pickup head 4 from moving in tangential directions of the track on the optical disc 1. Thus, the optical pickup head 4 is accurately positioned in a tangential direction of the track on the optical disc 1. In other words, the optical pickup head 4 reliably remains in a desired position as viewed in the tangential direction of the track on the optical disc 1. Therefore, provided that the members and the parts are accurately positioned, the laser beam from the objective lens 5 in the optical pickup head 4 is enabled to move exactly in a radial direction of the optical disc 1 in accordance with the movement of the optical pickup head 4 along the main guide shaft 8 and the auxiliary guide shaft 9.

The optical disc drive apparatus of FIGS. 2–6 operates as follows. The optical disc 1 on the turntable 7 is rotated by the spindle motor 10. The laser beam is outputted from the objective lens 5 in the optical pickup head 4, being applied to the information recording surface of the optical disc 1. The laser beam is reflected at the information recording surface of the optical disc 1 while being modulated in accordance with information thereon. The reflected laser beam returns to the optical pickup head 4, and enters a photodetector in the optical pickup head 4. The photodetector outputs an electric signal containing the information on the optical disc 1. In this way, the information is reproduced from the optical disc 1. During the reproduction of the information from the optical disc 1, the feed motor 16 moves the optical pickup head 4 in a radial direction of the optical disc 1 to enable the track on the optical disc 1 to be continuously scanned by the laser beam.

The optical disc drive apparatus of FIGS. 2–6 may be operated in a recording mode. In this case, the optical disc 1 on the turntable 7 is rotated by the spindle motor 10. The laser beam which contains information to be recorded is outputted from the objective lens 5 in the optical pickup head 4, being applied to the information recording surface of the optical disc 1. The information on the laser beam is recorded on the optical disc 1 when the laser beam encounters the information recording surface of the optical disc 1. In this way, the information is recorded on the optical disc 1. During the recording of the information on the optical disc 1, the feed motor 16 moves the optical pickup head 4 in a radial direction of the optical disc 1 to enable the optical disc 1 to be continuously scanned by the laser beam along a spiral line corresponding to an information recording track.

During the reproduction of the information from the optical disc 1 and also during the recording of the information on the optical disc 1, the tilt sensor 26 detects the angle between the optical axis of the objective lens 5 in the optical pickup head 4 and the information recording surface of the optical disc 1. The tilt sensor 26 outputs an electric signal representing the detected angle. The angle detected by the tilt sensor 26 depends on the tilt of the optical axis of the optical pickup head 4 relative to the information recording surface of the optical disc 1. A differential amplifier, a subtracter, a comparator, or a suitable signal processor following the tilt sensor 26 generates a signal representing the difference between the detected angle indicated by the output signal of the tilt sensor 26 and an angle of 90 degrees which is indicated by a reference signal. The generated angular difference signal also indicates the tilt of the optical axis of the optical pickup head 4 relative to the information recording surface of the optical disc 1. The tilt motor 19 in the tilt correcting mechanism 46 is controlled in response to the angular difference signal. When the angular difference differs from zero, the tilt motor 19 in the tilt correcting mechanism 46 is rotated by an amount corresponding to the angular difference. In this case, the tilt correcting mechanism 46 rotates the movable base 2 about the tilt shafts 13*a* and 13*b* to nullify the angular difference. As a result, the angular difference remains substantially null. In other words, the angle between the optical axis of the objective lens 5 in the optical pickup head 4 and the information recording surface of the optical disc 1 is substantially held equal to 90 degrees. Thus, the tilt of the optical axis of the optical pickup head 4 relative to the information recording surface of the optical disc 1 remains substantially nullified.

As previously mentioned, during the rotation of the movable base 2 about the tilt shafts 13*a* and 13*b*, the guide rollers 11 rotate relative to the guide surfaces 27 while remaining in contact therewith. The continuous contact between the guide rollers 11 and the guide surfaces 27 inhibits the main guide shaft 8 and the optical pickup head 4 from moving in tangential directions of the track on the optical disc 1. Thus, the optical pickup head 4 is accurately positioned in a tangential direction of the track on the optical disc 1. In other words, the optical pickup head 4 reliably remains in a desired position as viewed in the tangential direction of the track on the optical disc 1. Therefore, the tilt sensor 26 can accurately and stably detect the tilt of the optical pickup head 4. In addition, the tilt correcting mechanism 26 can accurately and stably correct the tilt of the optical pickup head 4.

As previously indicated, the leaf springs 12 urge the main guide shaft 8 to press the guide rollers 11 against the guide surfaces 27 of the guide members 24. Thus, the movable base 2 is located by the guide rollers 11 and the tilt pins 13*a* and 13*b* in a direction perpendicular to the direction of normal movement of the optical pickup head 4 on a plane approximately parallel to the optical disc 1.

It should be noted that the guide members 24 may be of a circular cross-section, or a polygonal cross-section different from the rectangular cross-section.

Figure 18:
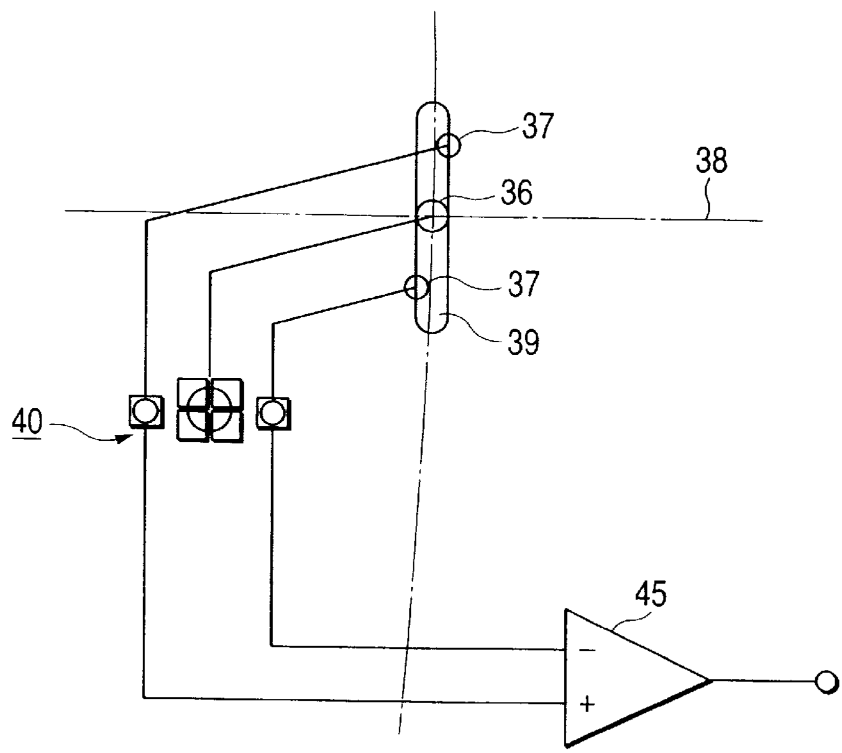
FIG. 18 is a diagram of laser light spots on an optical disc, a photodetector, and a comparator in the optical disc drive apparatus in FIG. 2.

The laser light source in the optical pickup head 4 is designed to generate, for example, three laser light beams (three laser beams). In this case, the laser light source is generally regarded as a combination of a laser-light emitting element and a grating following the element. As shown in FIG. 18, the three laser beams are a main laser beam 36 and two auxiliary laser beams 37. The main laser beam 36 and the auxiliary laser beams 37 are focused into respective spots on the information recording surface of the optical disc 1. The spot of the main laser beam 36 is placed between the spots of the auxiliary laser beams 37. The spots of the auxiliary laser beams 37 extend slightly inward and outward of the spot of the main laser beam 36, respectively. The main laser beam 36 is used to read out the information from the optical disc 1. The auxiliary laser beams 37 are used for tracking.

As shown in FIG. 18, the photodetector 40 in the optical pickup head 4 has a main photosensor and two auxiliary photosensors for receiving the reflected main laser beam 36 and the reflected auxiliary laser beams 37 respectively. The auxiliary photosensors output electric signals depending on the amounts or the intensities of the reflected auxiliary laser beams 37 which encounter the auxiliary photosensors, respectively. The output signals of the auxiliary photosensors are applied to two input terminals of a comparator 45, respectively. The comparator 45 implements the subtraction between the output signals of the auxiliary photosensors. The comparator 45 outputs a tracking error signal in response to the output signals of the auxiliary photosensors.

When the tracking is proper, that is, when the output signals of the auxiliary photosensors are equal in level, the spot of the main laser beam 36 is at the center of the track on the optical disc 1. In this case, the spot of the main laser beam 36 is on a radial line 38 of the optical disc 1. In addition, the spot of the main laser beam 36 moves accurately along the longitudinal center line of a pit 39 in the optical disc 1 as the optical disc 1 rotates. The continuous contact between the guide rollers 11 and the guide surfaces 27 inhibits movement of the optical pickup head 4 from its correct position along tangential directions of the track on the optical disc 1 which would impair the tracking.

Second Embodiment

Figure 7:
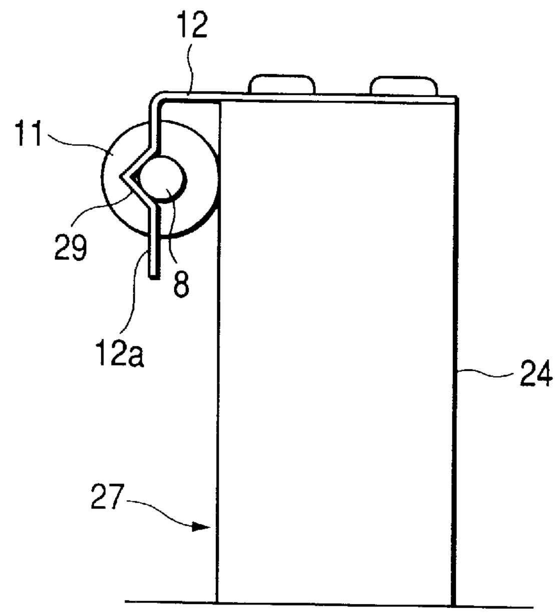
FIG. 7 is a side view of a guide member, a guide roller, and a main guide shaft in an optical disc drive apparatus according to a second embodiment of this invention.
Figure 8:
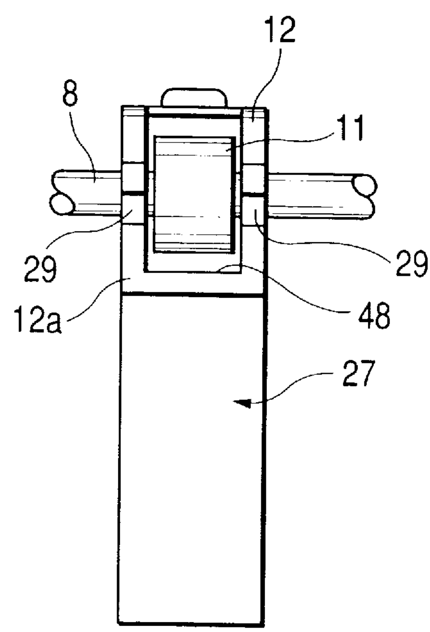
FIG. 8 is a front view of the guide member, the guide roller, and the main guide shaft in FIG. 7.

FIGS. 7 and 8 show a second embodiment of this invention which is similar to the embodiment of FIGS. 2–6 except for a design change indicated below.

In the embodiment of FIGS. 7 and 8, the vertical portion 12*a* of each of leaf springs 12 has V-shaped bent portions 29. A main guide shaft 8 fits into the bent portions 29 when being in its neutral position. The bent portions 29 can releasably hold the main guide shaft 8. During rotation of a movable base 2 (see FIGS. 2–4) about tilt shafts 13*a* and 13*b* (see FIGS. 2–4), the main shaft 8 can move into and out of the bent portions 29. The bent portions 29 are located and designed so that the neutral position of the main guide shaft 8 will correspond to a condition in which the optical axis of an optical pickup head 4 (see FIG. 3) is perpendicular to the information recording surface of an optical disc 1 having an original shape.

In the case where an apparatus power supply is turned off when the main shaft 8 fits into the bent portions 29, the main shaft 8 remains in the neutral position during a later stage.

Third Embodiment

Figure 9:
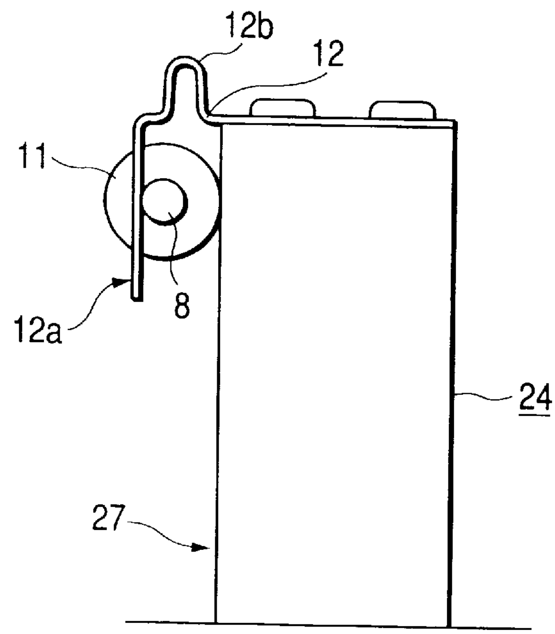
FIG. 9 is a side view of a guide member, a guide roller, and a main guide shaft in an optical disc drive apparatus according to a third embodiment of this invention.
Figure 10:
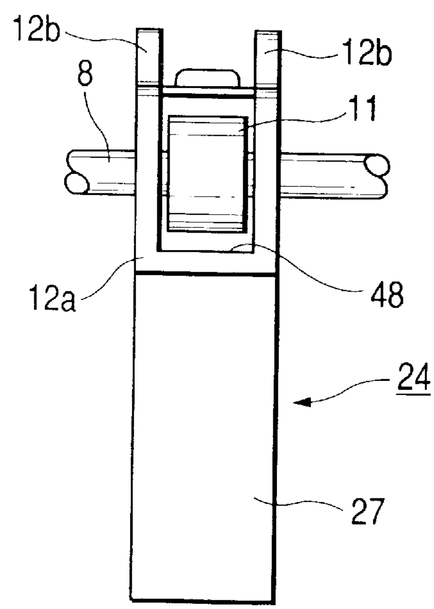
FIG. 10 is a front view of the guide member, the guide roller, and the main guide shaft in FIG. 9.

FIGS. 9 and 10 show a third embodiment of this invention which is similar to the embodiment of FIGS. 2–6 except for a design change indicated below.

In the embodiment of FIGS. 9 and 10, the horizontal portion 12*a* of each of leaf springs 12 has U-shaped bent portions 12*b*. The bent portions 12*b* enhance the resilience of the related leaf spring 12.

Fourth Embodiment

Figure 11:
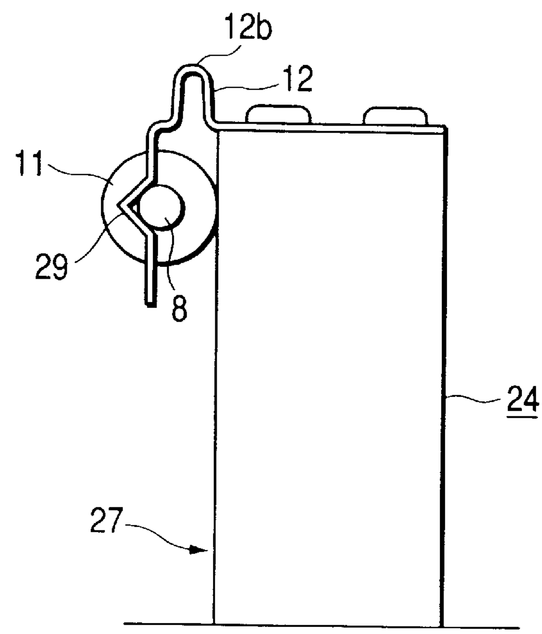
FIG. 11 is a side view of a guide member, a guide roller, and a main guide shaft in an optical disc drive apparatus according to a fourth embodiment of this invention.
Figure 12:
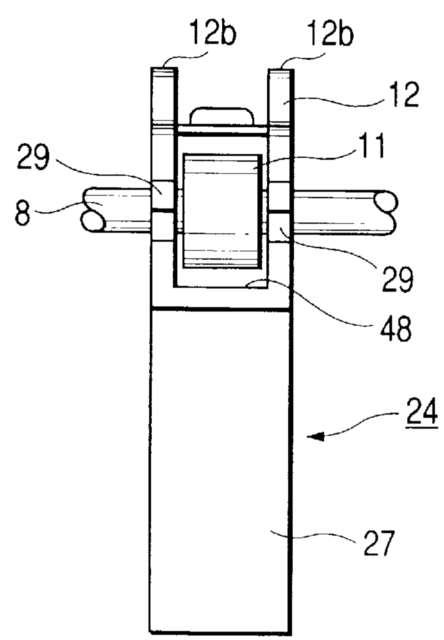
FIG. 12 is a front view of the guide member, the guide roller, and the main guide shaft in FIG. 11.

FIGS. 11 and 12 show a fourth embodiment of this invention which is similar to the embodiment of FIGS. 7 and 8 except for a design change indicated below.

In the embodiment of FIGS. 11 and 12, the horizontal portion 12*a* of each of leaf springs 12 has U-shaped bent portions 12*b*. The bent portions 12*b* enhance the resilience of the related leaf spring 12.

Fifth Embodiment

Figure 13:
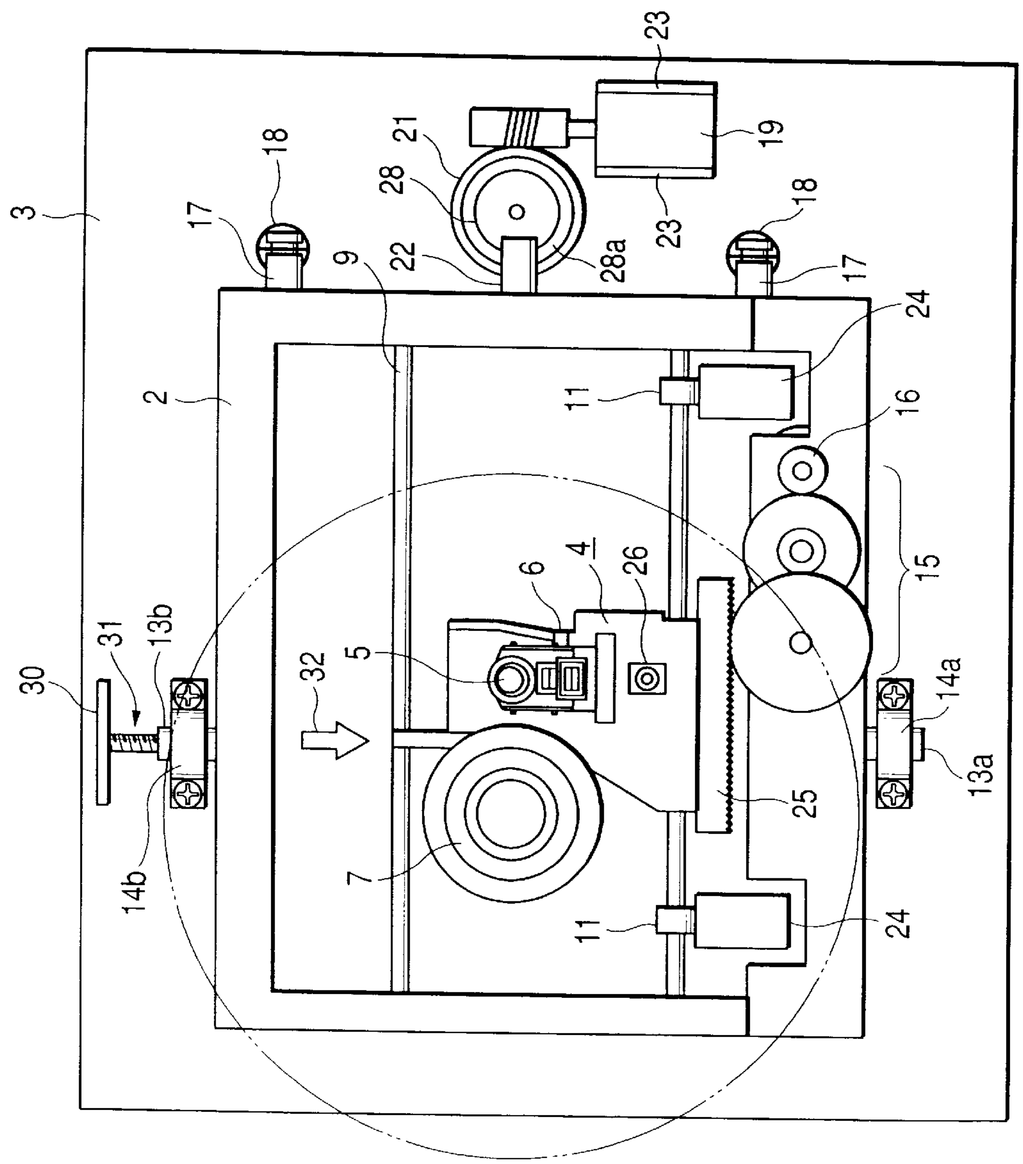
FIG. 13 is a plan view of an optical disc drive apparatus according to a fifth embodiment of this invention.
Figure 14:
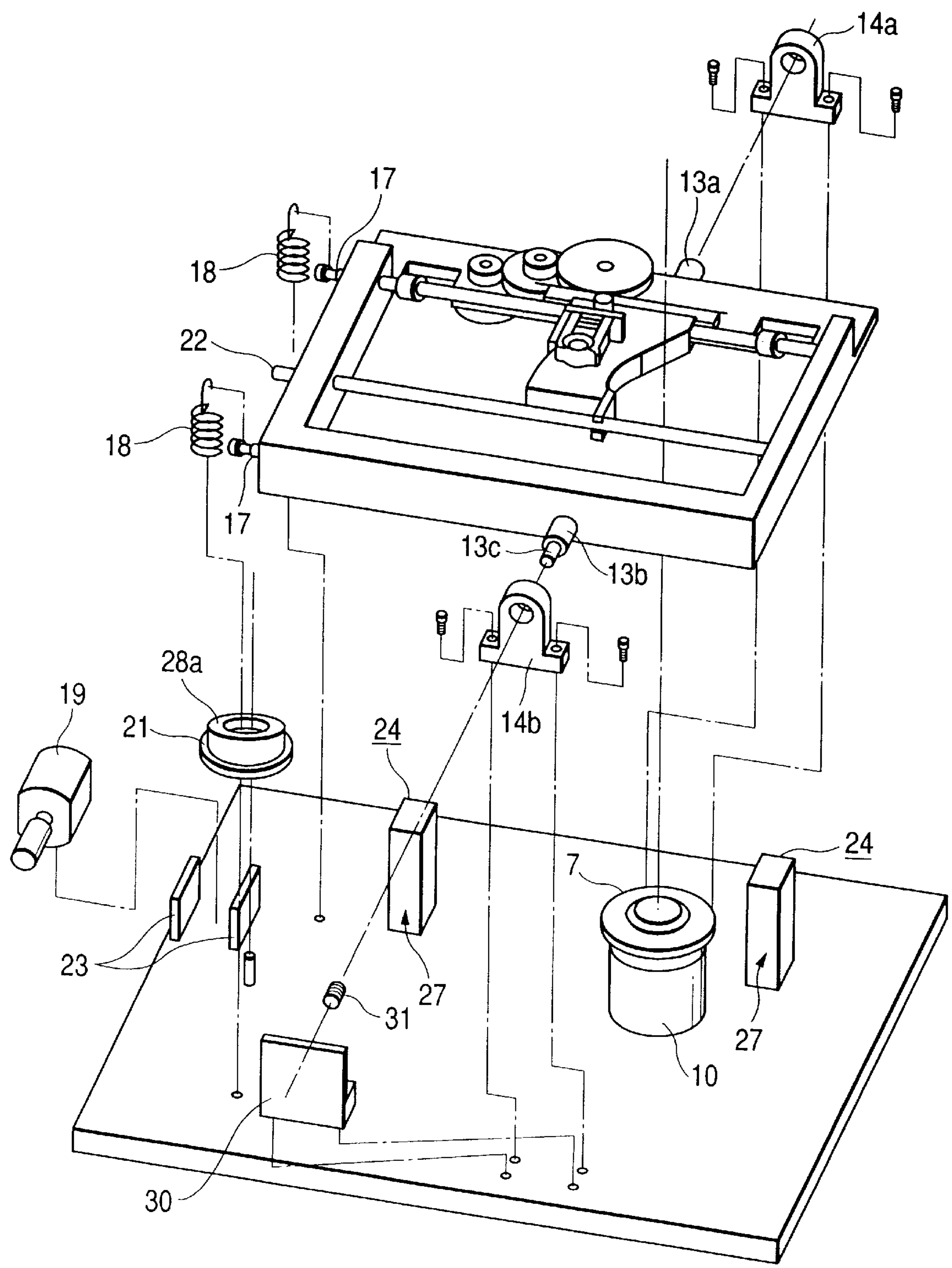
FIG. 14 is an exploded view of the optical disc drive apparatus in FIG. 13.

FIGS. 13 and 14 show a fifth embodiment of this invention which is similar to the embodiment of FIGS. 2–6 except for a design change indicated below.

In the embodiment of FIGS. 13 and 14, a tilt shaft 13*b* has a larger-diameter base portion, and a smaller-diameter end portion 13*c* extending from the larger-diameter base portion. The tilt shaft 13*b* has an annular step at the boundary between the larger-diameter base portion and the smaller-diameter end portion 13*c*.

Figure 15:
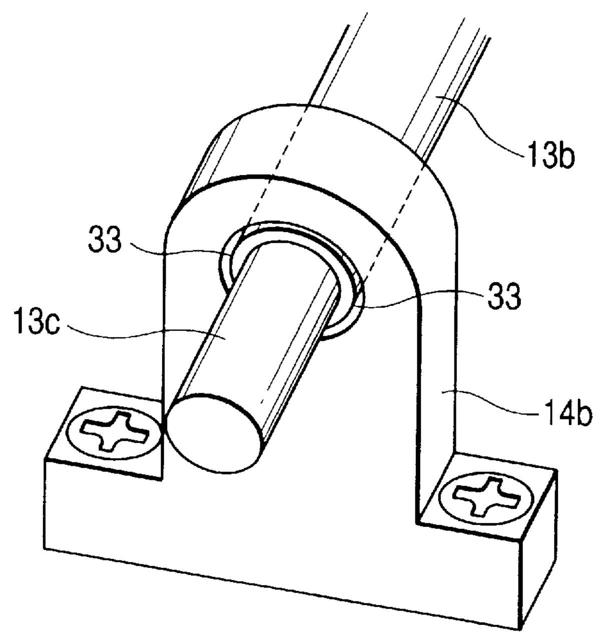
FIG. 15 is a perspective view of a tilt shaft and a hold member in the optical disc drive apparatus in FIG. 13.

As shown in FIGS. 13 and 15, the larger-diameter base portion of the tilt shaft 13*b* rotatably fits in a hole of a hold member 14*b*. The smaller-diameter end portion 13*c* of the tilt shaft 13*b* extends outward of the hold member 14*b*.

As shown in FIGS. 13 and 14, a plate member 30 fixedly extends from an apparatus base 3. A coil spring (helical spring) 31 is provided between the step of the tilt shaft 13*b* and the plate member 30 to urge the tilt shaft 13*b* in the axial direction of the tilt shaft 13*b* relative to the plate member 30. A portion of the spring 31 surrounds the smaller-diameter end portion 13*c* of the tilt shaft 13*b*. The spring 31 urges a movable base 2, and presses guide rollers 11 against guide surfaces 27 of guide members 24. Thus, it is possible to implement accurate and stable tilt correction.

Preferably, a small clearance 33 is provided between the outer surfaces of the tilt shaft 13*b* and the inner surfaces of the hold member 14*b* to allow smooth rotation of the tilt shaft 13*b* relative to the hold member 14*b*.

Figure 16:
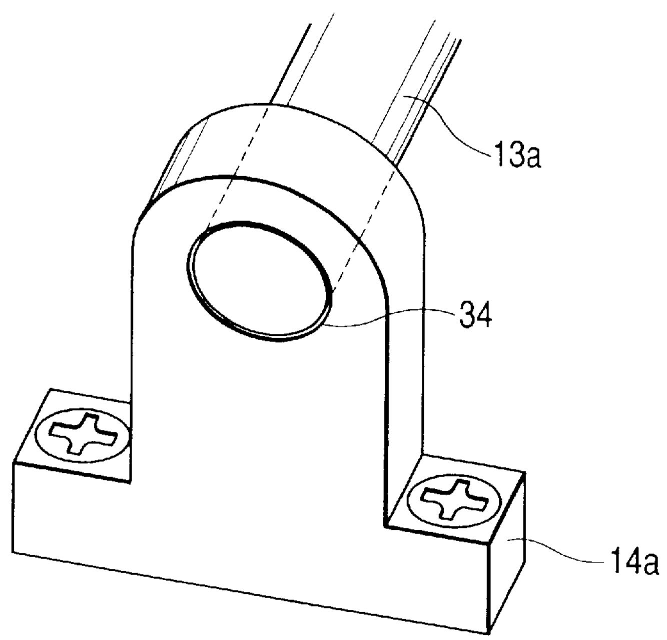
FIG. 16 is a perspective view of another tilt shaft and another hold member in the optical disc drive apparatus in FIG. 13.

As shown in FIG. 16, a tilt shaft 13*a* rotatably fits into a hole of a hold member 14*a*. Preferably, a small clearance 34 is provided between the outer surfaces of the tilt shaft 13*a* and the inner surfaces of the hold member 14*a* to allow smooth rotation of the tilt shaft 13*a* relative to the hold member 14*a*.

It should be noted that the spring 31 may be of another type such as a leaf type.

Sixth Embodiment

Figure 17:
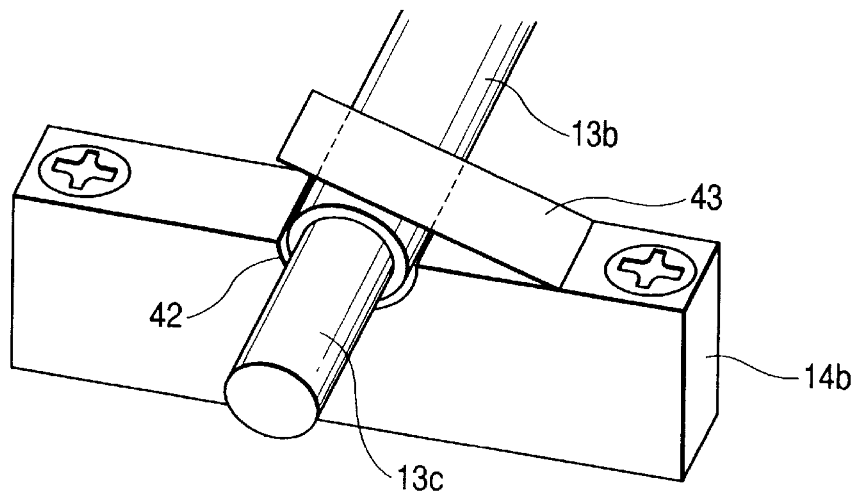
FIG. 17 is a perspective view of a tilt shaft and a hold member in an optical disc drive apparatus according to a sixth embodiment of this invention.

FIG. 17 shows a sixth embodiment of this invention which is similar to the embodiment of FIGS. 13–16 except for a design change indicated below.

In the embodiment of FIG. 17, a larger-diameter base portion of a tilt shaft 13*b* rotatably fits into a groove 42 in a hold member 14*c*. In other words, the larger-diameter base portion of the tile shaft 13*b* is rotatably received by the groove 42 in the hold member 14*c*. The groove 42 has a semicircular cross-section. A leaf spring 43 has an end screwed to the upper surface of the hold member 14*c*. The leaf spring 43 engages the larger-diameter base portion of the tilt shaft 13*b*. The leaf spring 43 presses the larger-diameter base portion of the tilt shaft 13*b* against the walls of the hold member 14*c* which define the groove 42.

What is claimed is:

1. An optical disc drive apparatus comprising:

a reference base;

a turntable provided on the reference base for receiving an optical disc thereon;

a guide shaft;

an optical pickup head supported by the guide shaft and being movable along the guide shaft in a radial direction of the optical disc on the turntable;

a movable base supporting the guide shaft and being movably connected to the reference base, the movable base being inclined relative to the reference base at an adjustable inclination angle;

means for moving the movable base relative to the reference base and adjusting the inclination angle to correct a tilt of an optical axis of the optical pickup head with respect to an information recording surface of the optical disc on the turntable;

a plurality of guide members fixed to the reference base and having respective guide surfaces; and guide rollers directly mounted on the guide shaft and being in continuous contact with the guide surfaces of the guide members respectively; wherein the continuous contact between the guide rollers and the guide surfaces inhibits the guide shaft and the optical pickup head from moving in a tangential direction of a track on said optical disc.

2. An optical disc drive apparatus as set forth in claim 1, comprising leaf springs for pressing the guide rollers against the guide surfaces of the guide members.

3. An optical disc drive apparatus as recited in claim 1, wherein the guide shaft includes a main shaft and an auxiliary shaft parallel to each other, and the guide rollers are connected to only one of the main and auxiliary shafts.

4. An optical disc drive apparatus as recited in claim 1, wherein the guide shaft consists of a main shaft and an auxiliary shaft parallel to each other, and the guide rollers are connected to only one of the main and auxiliary shafts.

5. An optical disc drive apparatus as recited in claim 1, wherein the guide rollers are coaxial with each other.

6. An optical disc drive apparatus, comprising:

a reference base;

a turntable provided on the reference base for receiving an optical disc thereon;

a guide shaft;

an optical pickup head supported by the guide shaft and being movable along the guide shaft in a radial direction of the optical disc on the turntable;

a movable base supporting the guide shaft and being movably connected to the reference base, the movable base being inclined relative to the reference base at an adjustable inclination angle;

means for moving the movable base relative to the reference base and adjusting the inclination angle to correct a tilt of an optical axis of the optical pickup head with respect to an information recording surface of the optical disc on the turntable;

a plurality of guide members fixed to the reference base and having respective guide surfaces;

guide rollers directly mounted on the guide shaft and being in contact with the guide surfaces of the guide members respectively; and leaf springs for pressing the guide rollers against the guide surfaces of the guide members;

wherein the leaf springs have bent portions for releasably holding the guide.

7. An optical disc drive apparatus comprising:

a reference base;

a turntable provided on the reference base for receiving an optical disc thereon;

a guide shaft;

an optical pickup head supported by the guide shaft and being movable along the guide shaft in a radial direction of the optical disc on the turntable;

a movable base supporting the guide shaft and being movably connected to the reference base, the movable base being inclined relative to the reference base at an adjustable inclination angle;

means for moving the movable base relative to the reference base and adjusting the inclination angle to correct a tilt of an optical axis of the optical pickup head with respect to an information recording surface of the optical disc on the turntable;

a plurality of guide members fixed to the reference base and having respective guide surfaces perpendicular to the reference base; and a pair of rotatable guide rollers connected to the guide shaft at positions near opposite ends of the guide shaft respectively and being in continuous contact with and rollable on the guide surfaces of the guide members respectively; wherein the continuous contact between the guide rollers and the guide surfaces inhibits the guide shaft and the optical pickup head from moving in a tangential direction of a track on said optical disc.

8. An optical disc drive apparatus as set forth in claim 7, further comprising leaf springs for pressing the guide rollers against the guide surfaces of the guide members.

9. An optical disc drive apparatus as recited in claim 7, wherein the guide shaft includes a main shaft and an auxiliary shaft parallel to each other, and the guide rollers are connected to only one of the main and auxiliary shafts.

10. An optical disc drive apparatus as recited in claim 7, wherein the guide shaft consists of a main shaft and an auxiliary shaft parallel to each other, and the guide rollers are connected to only one of the main and auxiliary shafts.

11. An optical disc drive apparatus as recited in claim 7, wherein the guide rollers are coaxial with each other.

* * * * *